United States Patent Office 3,436,026
Patented Apr. 1, 1969

3,436,026
METHOD OF COMMINUTING SOLID PARTICLES IN LIQUIDS
Hans Michael Wörwag, Waldackerstr. 15, Stuttgart, Zuffenhausen, Germany
No Drawing. Filed Oct. 11, 1966, Ser. No. 585,727
Claims priority, application Germany, Oct. 13, 1965, W 40,090
Int. Cl. B02c 19/00, 23/00
U.S. Cl. 241—16                                  4 Claims

ABSTRACT OF THE DISCLOSURE

There is provided a novel method of comminuting pigment agglomerations contained in lacquers which comprises passing the suspension of the pigment in the lacquer through capillary filters which are so dimensioned that a shearing of the solid particles to the desired size takes place.

---

The invention relates to the production of lacquers and products produced in a similar manner, such as leather stains, colouring materials for plastics, etc., and more especially to a method of comminuting agglomerated solid particles in liquids, particularly the pigment agglomerations contained in lacquers.

When dry pigments, which have for example in the case of titanium dioxide a grain size of about $1.5\mu$, are stored, it is impossible to avoid the formation of pigment agglomerations. These pigment agglomerations (agglomerates) must be broken down again with the addition of binder and solvent so as to ensure a uniform distribution of the pigment particles. This uniform fine distribution of the pigment is one of the decisive factors as regards the quality of the lacquer or similar product.

This comminution was carried out hitherto on roller frames, in ball and pebble mills, which required a considerable outlay on machinery. It is further known to effect this comminution by expansion or by introducing the lacquer into a turbulent flow. It is also known to use impact methods for this purpose. These methods also involved a high outlay on apparatus. Above all, it is possible with the aforementioned methods for even relatively large particles to pass undivided or not sufficiently divided through the machine, making several comminuting operations necessary.

It is the object of the invention to achieve the desired uniform pigment distribution and the desired size of the pigment particles in a simple manner, avoiding the disadvantages of the known methods.

According to the invention, this object is achieved in that the solid particles mixed with a liquid, more especially the pigment agglomerates mixed with solvent and binder, are pressed through capillary filters which are so dimensioned that a shearing of the solid particles to the desired size takes place.

In this manner, the advantage is obtained that the desired uniform pigment size is achieved without mechanically operated parts such as impact tools, scrapers, rollers and the like. The separator or second and third grinding operation essential in the known methods is also superfluous, since no return is necessary. The energy for the comminution is supplied solely by the pressure, resulting in a reduction in machinery costs.

The invention is further based on the knowledge that particularly sintered materials, for example sintered metals, or porous glass and ceramic materials are suitable as "filter materials," a porous high-strength filter being necessary for this purpose.

In carrying out the method according to the invention, the composition is pressed as a whole through the "filter," the desired comminution being effected by shearing. However, the method according to the invention is not in fact a filtering operation, since it is not the separation into substances of various particle sizes which is aimed at, but a comminution of pigment agglomerations to a particle size for which the "filter" concerned is permeable. The term "filter" has nevertheless been used in the description because those means which are often employed for filtering for other purposes in industry are particularly suited to carrying out the method according to the invention.

The sintered metal filters have the advantage that the capillaries run irregularly in all directions, so that with several changes in direction the shearing effect desired is guaranteed to a particular degree, since even elongated formations are divided into the desired uniform particle structure with certainty. In principle, all materials which are softer than the filter material and flowable may be comminuted.

In one embodiment of the invention the pigment agglomerations may be passed through a plurality of filters of various pore widths set up in series.

It has been found that with a lacquer mixture comprising alkyl resin (binder) and titanium dioxide (pigment) a pressure of about 50 atm. is required for a desired particle size of about $50\mu$. For a particle size of $25\mu$ a pressure of about 250 atm. is required and for a particle size of $12\mu$ a pressure of 350 to 400 atm. and for a particle size of $8-10\mu$ a pressure of 550–650 atm., using in each case the "filter" of sintered metal suitable for the particle size concerned and with further processing of the lacquer coarser by one filter size.

I claim:
1. A method of comminuting the pigment agglomerations contained in lacquers, characterized in that the pigment agglomerates mixed with solvent and binder, are pressed through capillary filters which are so dimensioned that a shearing of the solid particles to the desired size takes place.
2. A method according to claim 1, characterized in that sintered materials selected from the group consisting of sintered metal, porous glass and ceramic materials are used as said capillary filters.
3. A method according to claim 1, characterized in that the agglomerates are subjected when passing through the filters to several changes of direction, so that elongated formations are also divided.
4. A method according to claim 1, characterized in that a plurality of said filters of various pore widths are passed through in series.

References Cited
UNITED STATES PATENTS
2,399,705   5/1946   Ziehl _____ 241—16
FOREIGN PATENTS
881,074   11/1961   Great Britain.

GERALD A. DOST, *Primary Examiner.*

U.S. Cl. X.R.
241—21